United States Patent
Remmel et al.

(10) Patent No.: US 8,689,179 B2
(45) Date of Patent: Apr. 1, 2014

(54) TRANSPORTABLE REFACTORING OBJECT

(75) Inventors: Jürgen Remmel, Mühlhausen (DE);
Markus Peter Frick, Karlsruhe (DE);
Michael Schneider, Angelbachtal (DE);
Andreas Blumenthal, Heidelberg (DE);
Thomas Decker, Bad Schönborn (DE)

(73) Assignee: SAP AG, Walldorf (DE)

( * ) Notice: Subject to any disclaimer, the term of this patent is extended or adjusted under 35 U.S.C. 154(b) by 1074 days.

(21) Appl. No.: 12/332,503

(22) Filed: Dec. 11, 2008

(65) Prior Publication Data

US 2010/0153940 A1  Jun. 17, 2010

(51) Int. Cl.
*G06F 9/44* (2006.01)
*G06F 9/45* (2006.01)

(52) U.S. Cl.
CPC . *G06F 8/72* (2013.01); *G06F 8/443* (2013.01); *G06F 8/33* (2013.01); *G06F 8/20* (2013.01)
USPC ............ 717/110; 717/101; 717/107; 717/120

(58) Field of Classification Search
CPC ............. G06F 8/72; G06F 8/443; G06F 8/20; G06F 8/33; G06F 8/00
USPC .................................. 717/101–178; 719/328
See application file for complete search history.

(56) References Cited

U.S. PATENT DOCUMENTS

| | | | |
|---|---|---|---|
| 6,804,682 B1 * | 10/2004 | Kemper et al. | 1/1 |
| 6,807,548 B1 * | 10/2004 | Kemper | 1/1 |
| 6,851,105 B1 * | 2/2005 | Coad et al. | 717/106 |
| 7,076,762 B2 * | 7/2006 | Fisher | 717/102 |
| 7,237,236 B2 * | 6/2007 | Kershenbaum et al. | 717/154 |
| 7,370,318 B1 * | 5/2008 | Howe et al. | 717/110 |
| 7,509,346 B2 * | 3/2009 | Mathew | 1/1 |
| 7,721,250 B2 * | 5/2010 | Anand et al. | 717/100 |
| 8,010,938 B2 * | 8/2011 | Elaasar | 717/104 |
| 8,020,146 B2 * | 9/2011 | Hudson, Jr. | 717/120 |
| 2002/0194053 A1 * | 12/2002 | Barrett et al. | 705/10 |
| 2003/0145020 A1 * | 7/2003 | Ngo et al. | 707/201 |
| 2003/0188291 A1 * | 10/2003 | Fisher | 717/102 |
| 2004/0133875 A1 * | 7/2004 | Kramer | 717/101 |
| 2004/0261057 A1 * | 12/2004 | Shinomi | 717/114 |
| 2005/0273357 A1 * | 12/2005 | Barnes et al. | 705/1 |
| 2006/0241961 A1 * | 10/2006 | Tsyganskiy et al. | 705/1 |
| 2007/0011669 A1 * | 1/2007 | Varma et al. | 717/168 |
| 2008/0196005 A1 * | 8/2008 | Beckman et al. | 717/108 |
| 2009/0019426 A1 * | 1/2009 | Baeumer et al. | 717/122 |
| 2010/0064277 A1 * | 3/2010 | Baird et al. | 717/120 |
| 2010/0153914 A1 * | 6/2010 | Arsanjani et al. | 717/110 |

* cited by examiner

*Primary Examiner* — Lewis A Bullock, Jr.
*Assistant Examiner* — Francisco Aponte
(74) *Attorney, Agent, or Firm* — Buckley, Maschoff & Talwalkar LLC (57) ABSTRACT

A system and a method associated with a system landscape having a plurality of independent systems are provided to determine a refactoring object associated with modification of at least one code-based object and transport the refactoring object to a set of independent systems in the system landscape where each independent system is coupled to a communications network. Furthermore modifications of code-based objects are arranged to be performed at each of the set of independent systems in the system landscape.

20 Claims, 6 Drawing Sheets

TRANSPORTABLE REFACTORING OBJECT

FIELD

Some embodiments of the present invention may relate to refactoring in a distributed system landscape. In particular, some embodiments may comprise systems and methods that provide a transportable refactoring object.

BACKGROUND

In some cases, it may be desirable to perform a refactoring process to modify one or more code-based elements in a system. For example, refactoring might be performed to change the name of a variable or method wherever it appears in a software program. Such refactoring might improve the performance of the software program and/or improve the readability of the software code for other users (e.g., a variable named "Temp_X" might be renamed "Yearly_Sales" to help others understand the meaning of the code).

Typically, refactoring is performed with respect to a particular system. That is, all code residing at that system may be adjusted as appropriate to achieve the desired modifications. Note, however, that in some situations identical copies and/or similar versions of a software program may reside at a number of different systems throughout a system landscape. For example, a test system might have Version 1.1 of a particular software program, a development system may also have Version 1.1 of the program, and a production system may have Version 1.0 of the program.

To appropriately modify code-based elements throughout such a landscape, an operator could manually initiate a refactoring process with respect to each and every system in the landscape. This approach, however, may be inefficient and error prone—especially when there are a relatively large number of systems and/or refactorings that need to be performed. For example, an operator may need to provide manual input and authentication information in connection every system being modified. Also note that an automated attempt to blindly perform refactoring across multiple systems might breach applicable security protocols, and may even introduce errors in connection with the code-based elements (e.g., because a first refactoring may need to be completed before a second refactoring is initiated).

Approaches that improve refactoring a multi-system landscape could, therefore, be desirable. Moreover, it may advantageous to provide one or more systems and/or methods to do so in an efficient and convenient manner.

DETAILED DESCRIPTION

Figure 1:
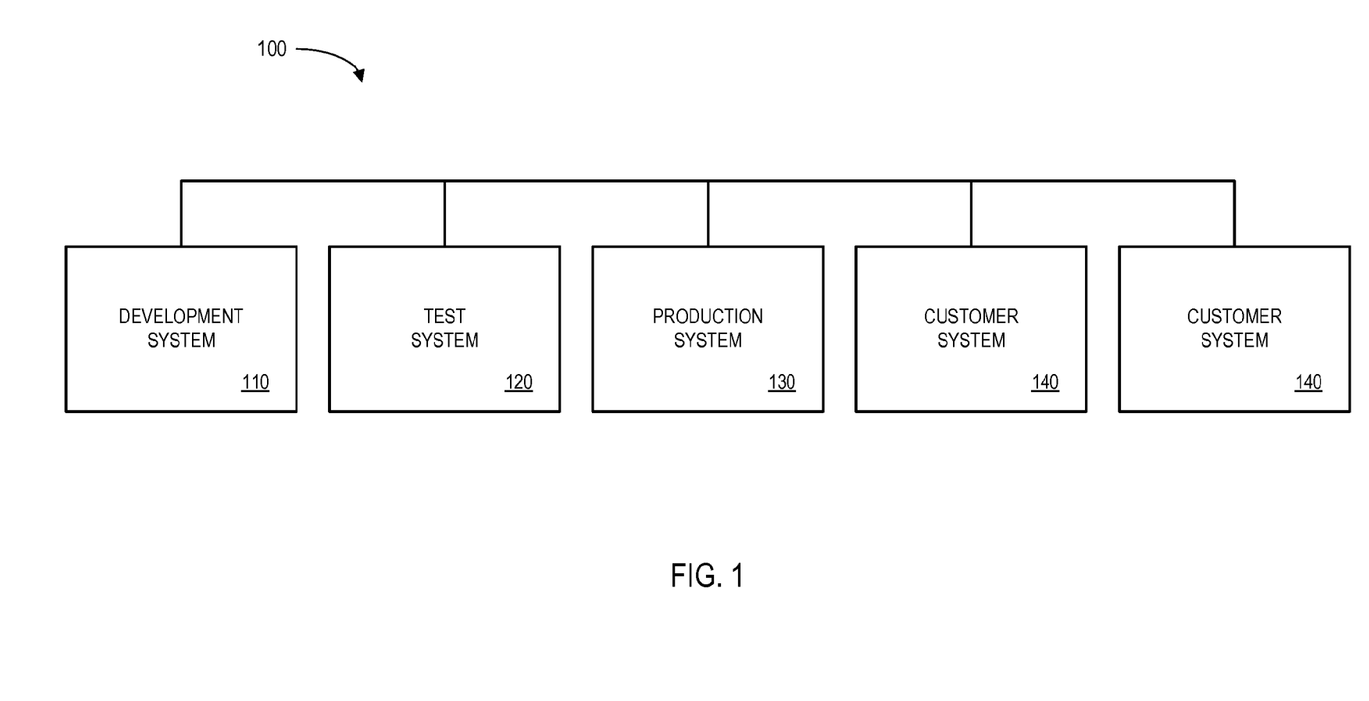
FIG. 1 is a block diagram of a system landscape according to some embodiments of the present invention.

FIG. 1 is a block diagram of a system landscape 100 according to some embodiments of the present invention. The landscape 100 may include, for example, a number of remote, independent systems able to exchange information via one or more communication networks, including a Local Area Network (LAN) and/or a Transfer Control Protocol/Internet Protocol (TCP/IP) based network. Moreover, one or more of the systems might be associated with a java platform or an Advanced Business Application Programming (ABAP) platform. By way of example only, the landscape 100 might include a development system 110, a test system 120, a production system 130, and/or a customer system 140. Note that any number of such systems might be included in the landscape 100.

In some cases, it may be desirable to perform a refactoring process to modify one or more code-based elements associated with the landscape 100. For example, refactoring might be performed to change the name of a variable or method wherever it appears in a software program that is stored at both the development system 110 and the test system 120. Such refactoring might improve the performance of the software program and/or improve the readability of the software code for other users (e.g., a variable named "Temp_X" might be renamed "Yearly_Sales" to help others understand the meaning of the code).

As used herein, the term "refactoring" may refer to any modification or adjustment to code-based objects or elements. By way of example, "refactoring" source code might modify it without changing its behavior (e.g., modifications might be made to "clean up" source code without adding new functionality). In some cases, refactoring might change the internal structure or design of a program, remove dead code, and/or make software more maintainable.

One example of refactoring is to change a variable name into something more meaningful. As another examples, code within an a particular portion of a program might be converted into a subroutine, element types or classes might be adjusted, or a method or field name might be changed.

Typically, refactoring is performed on a system-by-system basis. That is, all code residing at a particular system (e.g., all code residing only at the test system 120) might be adjusted as appropriate to achieve the desired modifications. Note, however, that in some situations identical copies and/or similar versions of a software program may reside at a number of different systems 110, 120, 130, 140 throughout the landscape 100. For example, the test system 120 might have Version 1.1 of a particular software program, the development system 110 may also have Version 1.1 of the program, and the production system 130 may have Version 1.0 of the program.

To appropriately modify code-based elements throughout the landscape 100, an operator could manually initiate a refactoring process with respect to each and every system 110, 120, 130, 140. This approach, however, may be inefficient and error prone—especially when there are a relatively large number of systems and/or refactorings that need to be performed. For example, an operator may need to provide manual input and authentication information in connection every system 110, 120, 130, 140 being modified. Also note that an automated attempt to blindly perform refactoring across multiple systems 110, 120, 130, 140 might breach applicable security protocols, and may even introduce errors in connection with the code-based elements (e.g., because a first refactoring may need to be completed before a second refactoring is initiated).

Figure 2:
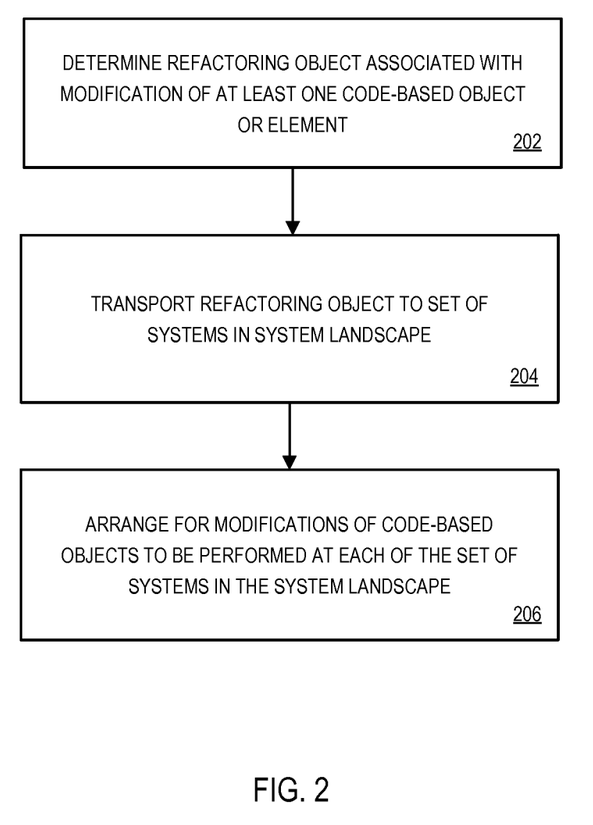
FIG. 2 illustrates a method according to some embodiments of the present invention.

According to some embodiments, a transportable refactoring object may be provided to facilitate modifications of code-based elements throughout the landscape 100. For example, FIG. 2 illustrates a method that might be associated with, for example, the system landscape 100 of FIG. 1 pursuant to some embodiments. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 202, a refactoring object is determined in connection with modification of at least one code-based object. The modification of a code-based object might be associated with, for example, renaming a code-based element, renaming a code-based method, renaming a code-based form, renaming a code-based variable, renaming a code-based class, and/or moving a code-based component.

At 204, the refactoring object is transported to a set of systems in the system landscape. According to some embodiments, this may include determining which systems in the system landscape will receive the refactoring object (e.g., which systems include a particular program or portion of code). By way of example, it might be determined that a particular modification should made at both a test system and a production system. In this case, the refactoring object might be inserted into a refactoring transport request that is then transmitted to those two systems. According to some embodiments, a system-wide identifier may be assigned to the refactoring object and/or the refactoring transport request.

At 206, it may be arranged for modifications of code-based objects to be performed at each of the set of systems in the system landscape. For example, at each system an original code portion might be copied to a modified code portion. Any references to the original code portion might then be adjusted at each system to reflect the modified code portion. The original code portion may then be deleted at each system that received the refactoring object.

Note that in some embodiments, approval of a party (e.g., user associated with the refactoring and/or systems in the landscape) may be required before the modifications described with respect to step 206 are performed. For example, an indication of approval associated with a refactoring object might be sought from a user (e.g., via a manual or semi-automatic messaging request, process, or user interface). According to this embodiment, only after receiving an appropriate indication of approval from a user will the modifications of code-based objects be performed at each of the set of systems in the system landscape. According to some embodiments, the user might instead provide an indication of non-approval (e.g., by affirmatively selecting such an indication or simply by failing to respond to the original request). In this case, one or more modifications associated with the refactoring might be prevented.

In some embodiments, it may be determined when all of the appropriate systems have completed the modifications of code-based objects in accordance with the refactoring object. When such a determination is made, a clean-up process associated with the refactoring object may be initiated. Moreover, subsequent to performance of the clean-up process, a notification might be generated and transmitted to indicate refactoring completion. For example, an email message might be sent to the user who initiated the refactoring throughout the system landscape.

Note that, according to some embodiments, a plurality of transportable refactoring objects may be simultaneously processed in the system landscape. For example, a first refactoring object might be associated with changing the name of a variable while a second refactoring object is associated with converting a portion of a program into a subroutine. Moreover, various modifications of code-based objects might be performed asynchronously and/or independently at each of the set of systems in the system landscape.

Figure 3:
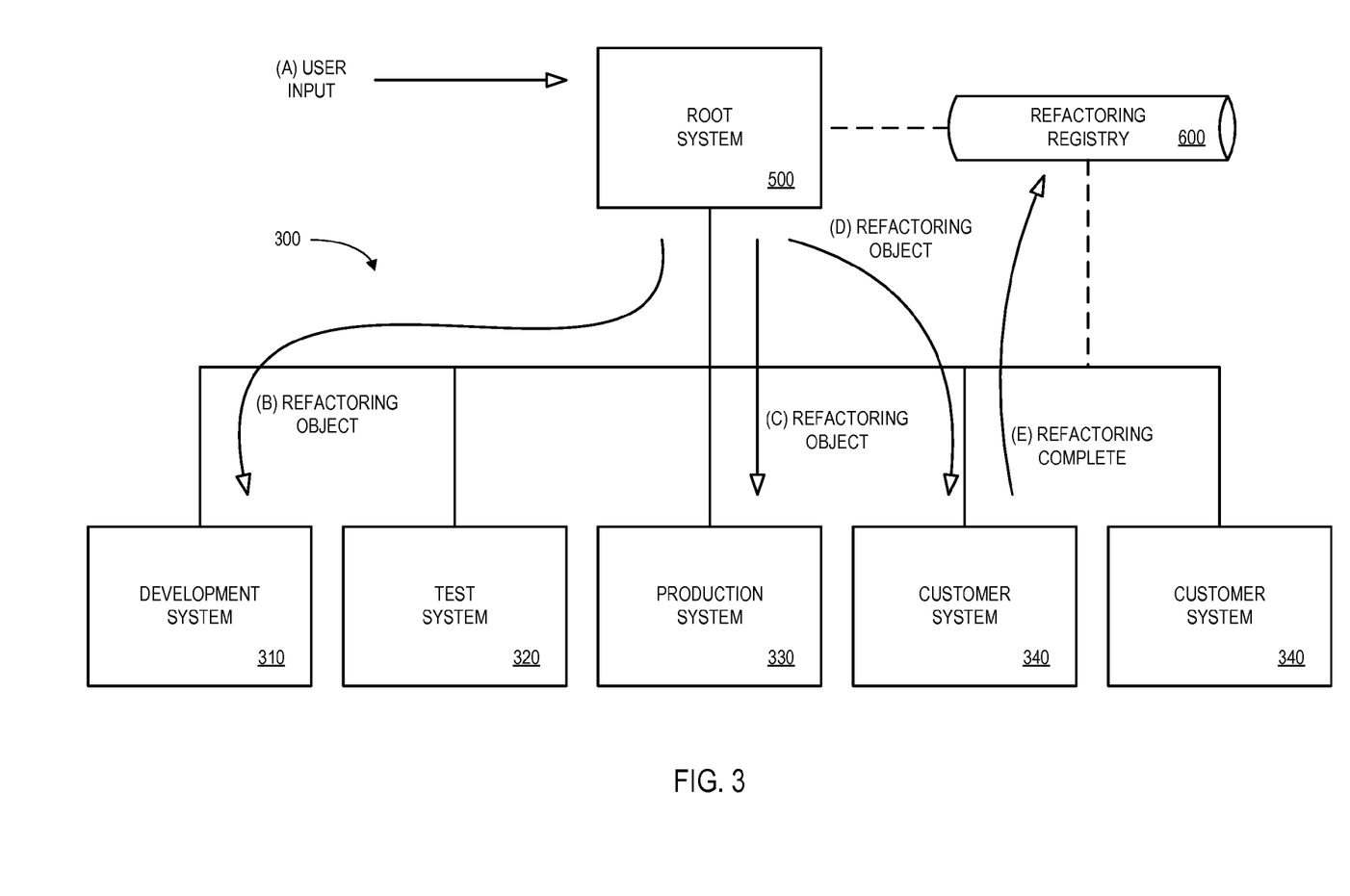
FIG. 3 is an information flow diagram associated with a system landscape according to some embodiments of the present invention.

FIG. 3 is an information flow diagram associated with a system landscape 300 according to some embodiments of the present invention. As before, the landscape 300 may include, for example, a number of remote, independent systems able to exchange information via one or more communication networks, including a LAN and/or TCP/IP based networks. Moreover, one or more of the systems might be associated with a java platform or an ABAP platform. By way of example only, the landscape 300 might include a development system 310, a test system 320, a production system 330, and/or a customer system 340. Note that any number of such systems might be included in the landscape 300.

In some cases, it may be desirable to perform a refactoring process to modify one or more code-based elements associated with the landscape 300. For example, refactoring might be performed to change the name of a variable or method wherever it appears in a particular software program. According to this embodiment, an indication of such a modification is received by a root apparatus 500 of the landscape as at user input at (A). For example, a programmer, designer, or operator might input the modifications that should be made in connection with the refactoring.

According to some embodiments, a transportable refactoring object may be provided to facilitate modifications of code-based elements throughout the landscape 300. For example, the root apparatus 500 might access information in a refactoring registry 600 to determine which systems 310, 320, 330, 340 should receive the refactoring object. In the example of FIG. 3, the root apparatus 500 transports the refactoring object, such as via a communication port or interface, to the development system 310 at (B), the production system at (C), and one of the remote customer systems 340 at (D). Note that some of the systems in the landscape might not need to receive the refactoring object (e.g., the program being modified might be stored at the test system 320 and the other customer system 340).

As will be described in connection with FIG. 4, the refactoring registry 600 might further facilitate a locking mechanism, refactoring dependencies, refactoring error handling, and/or a notification process. For example, each system in the landscape 300 might transmit an indication to the refactoring registry 600 and/or the root apparatus 500 when it completes a refactoring process. When all applicable systems report completion, an email message might be transmitted to the user who originally initiated the refactoring at (A).

By way of example, refactoring capabilities across the landscape 300 might be provided in connection with SAP NetWeaver® 2007, including one or more tools that support consistent renaming of elements of ABAP programs (e.g., methods, forms, and variables). Such an ability might not only support the daily work of programmers, but could also help existing software adhere to naming conventions and be used introduce/remove namespaces.

Although examples associated with the renaming of code-based elements are provided herein, note that other types of refactoring may be associated with any of the described embodiments. Moreover, in general some types of refactoring might include: (i) an intermediate solution, (ii) an adjustment, and (iii) a final solution. That is, many standard refactoring operations may be decomposed into: (i) one or more "safe" operations that are compatible and, hence, keep everything syntactically correct even in the case of only partial execution, and (ii) a second operation that finally yields the desired result of the refactoring.

In addition to the renaming of code-based elements, consider a renaming of enhancement spots and/or enhancement implementations. In this case, a copy of the enhancement spot may be created. Moreover, all references to the old spot may be renamed. In the second operation, references to the original spot may be deleted.

Note that refactoring might be associated with operations other than renaming code-based elements. For example, source code might be restructured by changing a method of a class into an interface. Similarly, refactoring might be associated with a deletion of program modules (such as function modules or methods) and/or a substitution of coding (e.g., without an associated renaming).

Figure 4:
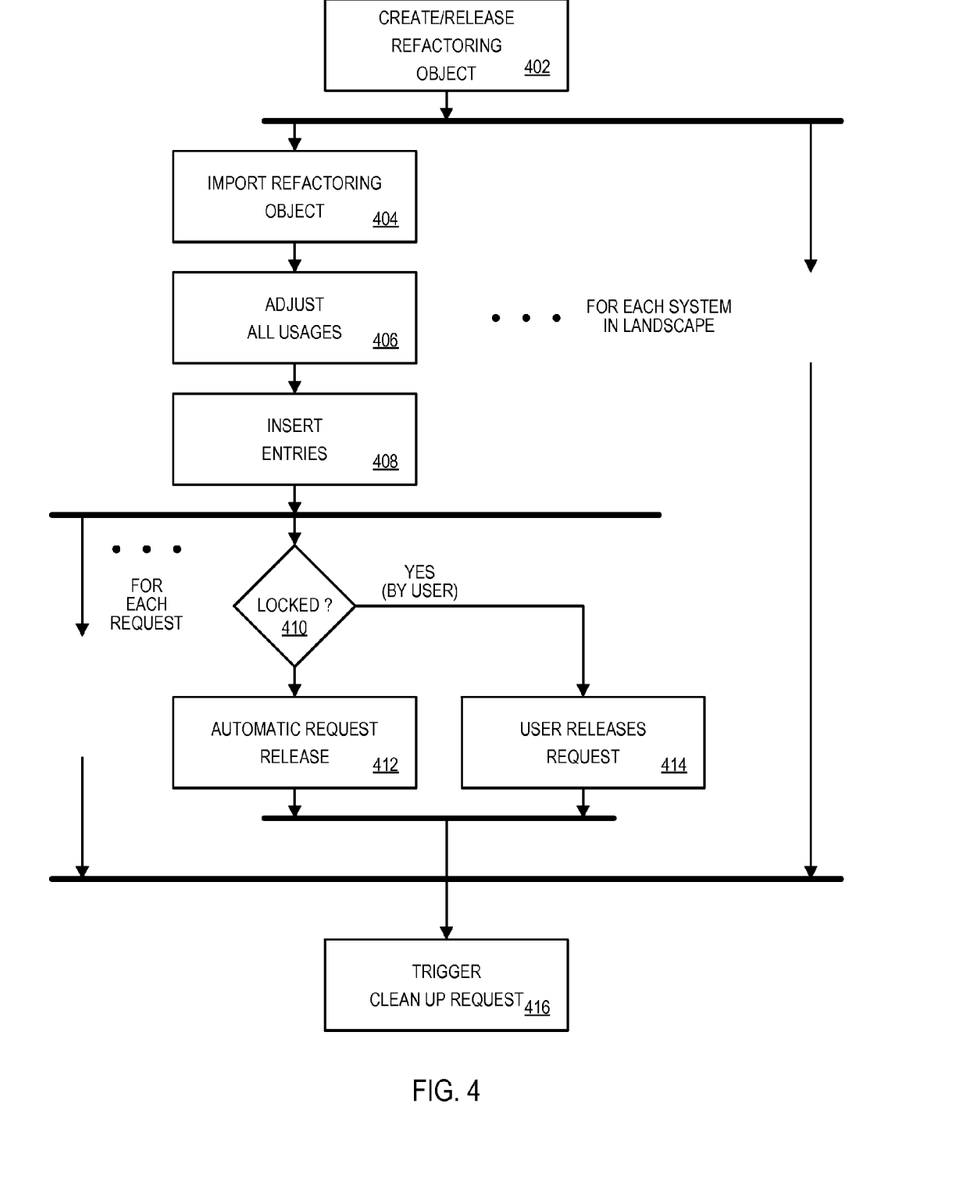
FIG. 4 illustrates a refactoring method according to some embodiments of the present invention.

FIG. 4 illustrates a refactoring method according to some embodiments of the present invention. Note that dependency between and/or synchronization points at certain actions described in connection with FIG. 4 may help maintain a relatively consistent system landscape.

At 402, a refactoring object is created and released. For example, a user at a root system may create a refactoring, insert it into a transport request which is then released. Upon creation, the root system may request a global identifier for the refactoring object to facilitate the identification of the refactoring within different systems across the landscape.

According to some embodiments, the following options might be defined by a creator: (i) who will be notified by which events (e.g. does the creator wish to be notified before a cleanup-request is released or should this happen automatically?), and (ii) what kind of process may govern the refactoring (e.g. if the creator knows that there are only a couple of usages within a software program, it might be advisable to reduce the number of actions in the method to omit complicated synchronization actions and, thus, shorten the execution of the process).

At 404, the refactoring object may be imported. Note that 404 (as well as 406 through 414) may be performed for each system and/or each refactoring object associated with the landscape. According to some embodiments, after a refactoring object is imported, a "where-used" list may be queried (e.g., to locate all usages in the system). Such a list may, for example, be sent to a central refactoring registry that coordinates/solves synchronization and completeness issues. Later, such a list may also be used to check for completeness of the adjustments (e.g., that all objects have been successfully adjusted and their respective transport requests been released).

At 406, usages associated with the refactoring object may be adjusted. For example, for each object from the "where-used" list of objects, there might be three potential statuses: (i) the object contains a syntax error or it is syntactically incorrect, (ii) the object is "unlocked" at 410, or (iii) the object is "locked" at 410 (e.g., by another transport request). In case (i), an alert entry may be placed in a modification adjustment transaction. This might, for example, lead to a user interaction in order to resolve the issue.

In case (ii), the object may be adjusted automatically at 406 and put into a suitable and automatically created transport request at 408. After all adjustments have been done, this request may released as appropriate at 412.

If (iii) is the case, then the adjustments may be made at 406 and any users owning the locking requests (from which these objects were locked earlier) might be notified via email. The user may then release the lock at 414. According to some embodiments, a request identifier, which locks the adjusted object, may be logged in a dedicated location.

Moreover, according to some embodiments, for all the objects adequate modification adjustment transaction-entries may be written (to log changes and make the process traceable). These modification adjustment transaction-entries may be, for example, specific to the responsible user who additionally receives a notification via email. In addition, for those modification adjustment transaction-entries where the conflict has been resolved automatically, a corresponding modification adjustment transaction-status alert may be cleared.

Thus, there may be two ways in which transports, containing objects depending on a refactoring, may be released: such requests may be released automatically, or objects may be stuck with respect to an already existing request and must wait until the request is released manually (e.g., by a notified user).

Whenever a request is released, the process may check whether or not there are still locked objects associated with the same refactoring object. This might be done, for example, by checking whether there are requests in a dedicated place that are still locked.

When all objects of a system that depend on a single refactoring have been adjusted, a notification may be transmitted to the refactoring registry. In this way, system after system may confirm to the refactoring registry that a refactoring has been executed successfully. Note that such confirmation might not be fail safe. For example, if the refactoring registry is unavailable when a request is released, the event may not be logged. To address such a situation, a log may be created and during a nightly job a connection to the refactoring registry can be established (and thus the pending data may be provided).

At 416, a clean-up request may be triggered in connection with the refactoring object. Such an action may, for example, depend on a multi-phase commit of all systems in the landscape, each of which signals that in their system all necessary adjustments have been done and, additionally, all corresponding transport requests have been released. To avoid any inconsistencies, this may need to have happened in all systems of the landscape. According to some embodiments, the clean-up simply finishes the refactoring in the root system and releases the respective transport request. Upon an adequate notification (e.g., via email) this may be done manually by the user who created the landscape-wide or "global" refactoring.

According to some embodiments, altering development objects may involve the treatment of objects that are already locked by other development requests. These requests may, for example, bundle refactoring-related transport requests with other types development requests. As a result, it may be necessary to synchronize and/or delay the entire refactoring.

To avoid such a situation, a "take the last known good" approach may be provided. For example, to resolve conflicting dependencies when an object is already locked, the following actions might be performed:

i. retrieve the latest version of the include in the system (e.g., the one that was active before the locking request has been created) and adjust this include;

ii. insert this include into the request to trigger an "interleaved" transport; and iii. also adjust the currently latest version in the system, bundle the corresponding request and immediately release it (to avoid jams).

Note that such an approach might require extensions to an existing transport system. For example, a to transport interleaved versions might need to be supported: Let V0 be the currently active version in the system, locked by request R0. Moreover, V1 denotes the latest transported version. The above procedure executes the adjustments caused by the refactoring in V0 and in V1 and obtains V0' and V1'. Subsequently, the include V1' is put in the interleaved transport request, and a request for V0' is bundled with R0.

Furthermore, it should be noted that this approach might fail (e.g., it might be the case that V1 is not syntactically correct in the new setting), and may impede doing the adjustments (when only syntactically correct compilation units can be refactored).

Thus, after creating a refactoring, it may be transported through the entire landscape. Moreover, import described with respect to 404 may occur asynchronously in each system of the landscape and each request, which locks a part of a refactoring, might yield a new execution thread. According to some embodiments, all of these threads are synchronized before the "cleanup-request" is triggered at 416. Note that a system in the landscape might be considered clean with respect to a refactoring if all objects of the system that are affected by the refactoring are both adjusted and released.

According to some embodiments, two phases of synchronization may be provided:

1) The second split into execution threads may happen in a single system. After doing all necessary adjustments and logging these into an appropriate modification adjustment transaction, there might be other unreleased requests (e.g., some ordinary development requests) that lock objects from the refactoring. Whenever one of these development requests is released, it can be determined whether or not there are still unreleased requests (withholding requests in the refactoring) in the current system. in this way, each system can decide when it is clean, and report this fact to the refactoring registry. The refactoring registry can now recognize when the entire landscape is clean (that is, all systems in the landscape are clean) and the final "cleanup-request" may be triggered at 416. Since this may not work if the central refactoring registry is offline, a second synchronization phase may be provided.

2) The system-wide integration might be realized by a daily job process running in all systems in the landscape. The process may locally check if the above requests have all been released. If this is the case (that is, all corresponding transport objects have been released), then a signal may be sent to the refactoring registry to indicate that the sender's system is clean. When all systems in the landscape are clean, the creator of the refactoring object may be notified that the cleanup-request can now be released. This notification may be, for example, triggered by the refactoring registry and consist of an email message.

Note that after all usages have been adjusted, one or more users might add new usages of a method that is to be deleted later. To avoid such a problem, the old method might be declared to be "deprecated." In this case, every usage of the method may causes a to-do relevant syntax warning, which additionally may advice the developer to use the new (non-deprecated) method. A nightly job might, in some embodiments, re-compute the usage list and adjust new usages.

For the supportability and traceability, it might be helpful to have "normal" and refactoring transport requests distinguishable. According to some embodiments, refactoring requests are technically equal to normal transport requests and are additionally decorated with a standard comment (e.g., indicating "this is a generated transport request related to refactoring RO_101). According to other embodiments, a new kind of transport request may be provided for refactoring purposes. In either case, a directory in each system might be maintained which includes all refactoring-related requests.

With a refactoring request itself, an additional runt time monitor check might be sent through the landscape to check for dynamic accesses of the now obsolete elements of a development object (e.g. the old method in case of a method rename). All such accesses might be logged in the system and transferred to refactoring registry—this log might include, for example, the usage and, thus, the person responsible for the adjustment. After the adjustment is made and the corresponding transport request is released, a signal may be sent to the refactoring registry (e.g., to facilitate the synchronization before the cleanup-request). Additionally, to facilitate analysis, all information might be stored locally in the system (e.g., to reduce dependency on the refactoring registry).

When refactoring objects are transported into remote customer systems (including development systems), the standard process described herein may be triggered. This means, that after retrieving an adequate where-used list, all these objects may be adjusted and put into an appropriate log.

Note that refactorings may receive identifiers that only sort them partially. Using these identifiers, the system may help make sure that mutually dependent refactorings are executed in an appropriate order. Also note that there are a number of ways in which refactorings might be dependent (e.g., renaming methods from different classes may be considered independent, while renaming method A to B and then B to C in the same class may be considered dependent).

According to some embodiments, the technical basis for the refactoring is accompanied by a set of tools that allow developers and administrators monitor the refactoring process. Among these tools may be a Graphical User Interface (GUI) or other display showing the progress of a refactoring (e.g., which systems are clean or why certain systems are unclean).

Furthermore, according to some embodiments a user may be able to withdraw a refactoring, which may stop the original refactoring from being diffused any further and which also may undo any already performed changes. In the case of a renaming, the target name can be altered later and the respective refactoring object be handled as if it were a rollback followed by a new renaming operation.

According to some embodiments, only objects original to a system are modified in a system. This may, for example, help maintain a level of consistency and traceability throughout the process in which refactorings are transported through a system landscape. Moreover, according to some embodiments, modified objects may be put into and transported with dedicated transport requests. Further, refactorings might, in some embodiments, always be decomposed into a compatible change that enables all necessary adjustments in other objects (an "intermediate" solution), a subsequent adjustment of possible other development objects (an "adjustment"), which is itself followed by a substantially non-compatible deletion of the now redundant part (a "final" solution). For example, a rename operation for a method may consist of: (i) a copy operation of the original method, (ii) the necessary adjustments in other development objects (e.g., the callers of the method) and (iii) the delete operation for the original method.

As an example according to some embodiments described herein, a function module might be refactored and/or renamed by transporting a copy of the new function module into a target system. Calls to the old function module may then be changed to the new function module. According to some embodiments, changes to these calls might be verified by asking a proprietor associated with each call for approval of the change (e.g., via a manual or semi-automatic messaging process). After the calls have been changed as appropriate, the old function module may be deleted.

Note that refactoring might be executed in an automated, self-contained manner (e.g., as with an agent) in various software landscapes (including, for example, a customer landscape). Thus, a party may be able to use some embodiments described herein even when he or she is unaware of the details of a target landscape (which might be very different from the source system for which the refactoring was initially defined and/or tested). This improved ability may be a significant benefit of some embodiments described herein. Note that when a system includes substantial differences, an explicit approval by a user may be required before the refactoring is executed (e.g., to help ensure that no inappropriate changes result).

Figure 5:
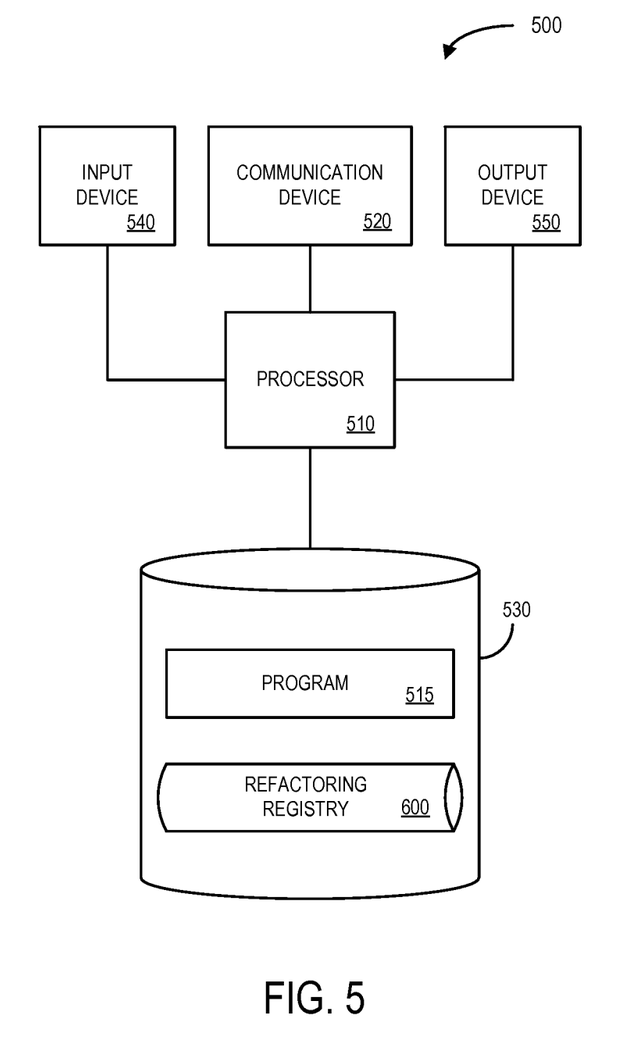
FIG. 5 illustrates an apparatus in accordance with some embodiments of the present invention.

FIG. 5 illustrates an apparatus 500 in accordance with some embodiments of the present invention. The apparatus 500 might, for example, be associated with a root system that includes a processor 510, such as one or more INTEL® Pentium® processors, coupled to a communication device 520 configured to communicate via a communication network (not shown in FIG. 5). The communication device 520 may be used to exchange information, for example, with one or more remote systems in a landscape. Note that elements described herein as communicating with one another may be directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between devices and/or systems may proceed over any one or more transmission protocols that are or become known, such as Asynchronous Transfer Mode (ATM), Internet Protocol (IP), Hypertext Transfer Protocol (HTTP), and/or Wireless Application Protocol (WAP).

The processor 510 is also in communication with an input device 540. The input device 540 may comprise, for example, a keyboard, a mouse, or computer media reader. Such an input device 540 may be used, for example, to enter information about a desired refactoring to be performed in a landscape. The processor 510 is also in communication with an output device 550. The output device 550 may comprise, for example, a display screen or printer. Such an output device 550 may be used, for example, to provide reports and/or display information associated with refactorings that are in process or that have been completed in connection with a landscape.

The processor 510 is also in communication with a storage device 530. The storage device 530 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

Figure 6:
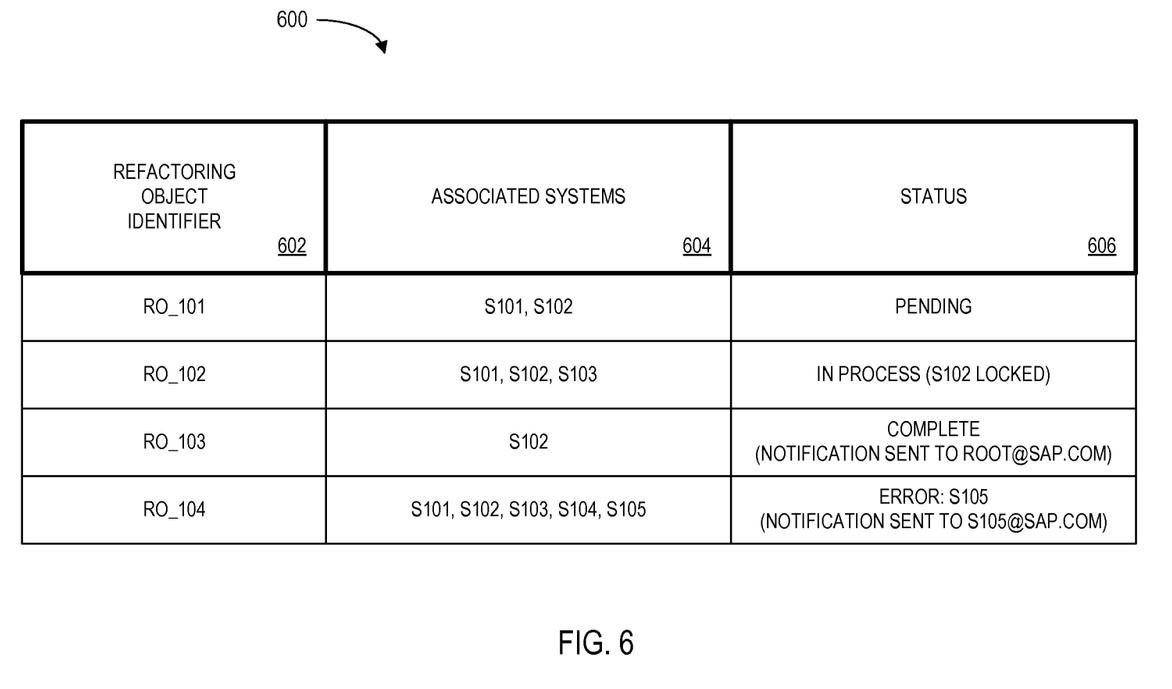
FIG. 6 is a tabular view of a refactoring registry in accordance with some embodiments of the present invention.

The storage device 530 stores a refactoring registry 600 along with a program 515 for controlling the processor 510. The processor 510 performs instructions of the program 515, and thereby operates in accordance any embodiments of the present invention described herein. For example, the processor 510 may determine a refactoring object associated with modification of at least one code-based object. The processor 510 may also transport the refactoring object to a set of systems in a system landscape and arrange for modifications of code-based objects to be performed at each of those systems.

As used herein, information may be "received" by or "transmitted" to, for example: (i) the apparatus 500 from other devices; or (ii) a software application or module within the apparatus 500 from another software application, module, or any other source.

FIG. 6 is a tabular view of a refactoring registry 600 in accordance with some embodiments of the present invention. The illustration and accompanying description of this data structure is exemplary, and any number of other arrangements could be employed besides those suggested by the figure. The table includes entries associated with refactorings to be performed throughout a system landscape. The table also defines fields 602, 604, 606 for each of the entries. The fields specify: a refactoring object identifier 602, associated systems 604, and a status 606. The information in the refactoring registry 600 may be periodically created and updated based on information received from a user and/or from remote systems within the landscape.

The refactoring object identifier 602 may be, for example, a globally unique alphanumeric code associated with a modification to be made to one or more code-based objects. The associated systems 604 may indicate which systems in a landscape need to be modified in connection with that refactoring object. For example, as illustrated in FIG. 6 the refactoring object having an identifier of "RO_102" may impact systems S101, S02, and S103.

The status 606 may indicate the current status of the refactoring being performed across the landscape for that refactoring object. The status 606 might indicate, for example, that a refactoring is pending (e.g., has not yet started), is in process (e.g., has started but not yet finished), or is compete. The status 606 might further indicate if an error has occurred, if a notification has been transmitted in connection with the refactoring (along with an address that received the notification), and/or whether or not a particular system or portion of a system is currently "locked" (thus preventing refactoring modifications).

Note that the refactoring registry 600 may store any other type of information instead of, or in addition to, the information illustrated in FIG. 6. For example, the refactoring registry 600 might store an indication of the specific changes to be made to code-based elements, a log history of changes that have been made, dependencies associated with a refactoring object, and/or version specific rules associated with a refactoring object.

Thus, embodiments may provide for improved refactoring in a multi-system landscape. Moreover, embodiments may do so in an efficient and convenient manner.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although embodiments have been described as being used to implement refactoring in connection with specific types of systems (e.g., development, test, and production systems) any other type of distributed system landscape may be associated with the present inventions. Similarly, embodiments may be associated with various types of languages and protocols including, for example, Java-based systems. Moreover, although particular types and examples of refactorings have been described, embodiments may be associated with any other type of appropriate modifications to code-based objects or elements.

The several embodiments described herein are solely for the purpose of illustration. Persons skilled in the art will recognize from this description other embodiments may be practiced with modifications and alterations limited only by the claims.

What is claimed is:

1. A method associated with a system landscape having a plurality of independent systems, comprising:
   determining a refactoring object associated with modification of at least one code-based object;
   transporting the refactoring object to a set of independent systems in the system landscape via inserting, at a root system, the refactoring object into a refactoring transport request and distributing the refactoring transport request to the set of independent systems, each independent system coupled to a communications network, wherein the independent systems comprise a test system and a production system;
   arranging for modifications of code-based objects to be performed at each system of the set of independent systems in the system landscape;
   maintaining a refactoring registry associated with refactoring objects, the refactoring registry comprising a refactoring object identifier, a system associated with the refactoring object identifier and a status, wherein the status includes current state of the refactoring as being pending, in process, complete or occurrence of an error; and
   receiving an indication from each independent system at the refactoring registry, the indication confirming whether the refactoring has been executed successfully.

2. The method of claim 1, wherein a modification of a code-based object is associated with at least one of: (i) renaming a code-based element, (ii) renaming a code-based method, (iii) renaming a code-based form, (iv) renaming a code-based variable, (v) renaming a code-based class, or (vi) moving a code-based component.

3. The method of claim 1, wherein the independent systems further comprise a development system or a customer system.

4. The method of claim 1, wherein said arranging is associated with: copying an original code portion to a modified code portion; adjusting references to the original code portion to reflect the modified code portion; and deleting the original code portion.

5. The method of claim 1, wherein the refactoring object comprises a global identifier associated with the refactoring object to facilitate the identification of the refactoring within the set of independent systems.

6. The method of claim 1, further comprising:
   determining the set of the independent systems in the system landscape to receive the refactoring object.

7. The method of claim 1, further comprising:
   in response to the received indication, initiating a clean-up process associated with the refactoring object wherein the refactoring registry recognizes when the system landscape is clean and triggers a final cleanup-request in response to the system landscape being clean.

8. The method of claim 7, wherein the refactoring registry is used to facilitate at least one of: (i) a locking mechanism, (ii) refactoring dependencies, (iii) refactoring error handling, or (iv) a notification process.

9. The method of claim 1, wherein a plurality of transportable refactoring objects are simultaneously processed in the system landscape.

10. The method of claim 1, wherein modifications of code-based objects are performed asynchronously and independently at each of the set of systems in the system landscape.

11. The method of claim 1, wherein at least one system in the system landscape is associated with at least one of: (i) a java platform, or (ii) an advanced business application programming platform.

12. A system landscape, comprising:
   a plurality of independent systems connected via a communications network, each independent system comprising a processor, the plurality of independent systems comprising:
      a root system to: (i) determine a refactoring object associated with modification of at least one code-based element, and (ii) transport the refactoring object via inserting, at the root system, the refactoring object into a refactoring transport request and distributing the refactoring transport request to the set of independent systems wherein the independent systems comprise a test system and a production system; and
      a root system interface to communicate with a plurality of independent systems, wherein the independent systems are to: (i) receive the refactoring object, and (ii) modify local code- based elements in accordance with the refactoring object, (iii) maintain a refactoring registry associated with refactoring objects, the refactoring registry comprising a refactoring object identifier, a system associated with the refactoring object identifier and a status, wherein the status includes current state of the refactoring as being pending, in process, complete or occurrence of an error; and
      (iv) receive an indication from each independent system at the refactoring registry, the indication confirming whether the refactoring has been executed successfully.

13. The system landscape of claim 12, wherein the refactoring registry adapted to facilitate at least one of: (i) a locking mechanism, (ii) refactoring dependencies, (iii) refactoring error handling, or (iv) a notification process.

14. The system landscape of claim 12, wherein at least one independent system in the system landscape is further to (i) copy an original code portion to a modified code portion, (ii) adjust references to the original code portion to reflect the modified code portion, and (iii) delete the original code portion.

15. A non-transitory computer-readable medium storing processor-executable process steps that, when executed by a processor, perform a method, wherein the method comprises:
   determining, at a root system, a refactoring object associated with modification of at least one code-based object;
   inserting, at the root system, the refactoring object into a refactoring transport request; and
   maintaining, at the root system, a refactoring registry associated with refactoring objects wherein the refactoring registry comprises a refactoring object identifier, a system associated with the refactoring object identifier and a status, wherein the status includes current state of the refactoring as being pending, in process, complete or occurrence of an error;
   distributing the transport request from the root system to a plurality of remote independent systems in a system landscape, each independent system coupled to a communications network, wherein the independent systems comprise a test system and a production system,
   wherein each of the plurality of remote independent systems in the system landscape is to:
      receive the refactoring transport request,
      copy an original code portion to a modified code portion,
      adjust references to the original code portion to reflect the modified code portion in accordance with the refactoring object,
  delete the original code portion, and
  transmit an indication to the refactoring registry, the indication confirming whether the refactoring has been executed successfully.

16. The computer-readable medium of claim 15, wherein the plurality of systems in the system landscape includes at least one of: a development system or a customer system.

17. The computer-readable medium of claim 15, wherein at least one remote system in the system landscape is associated with at least one of: (i) a remote java platform, or (ii) a remote advanced business application programming platform.

18. A method associated with a system landscape having a plurality of independent systems, comprising:
  determining a refactoring object associated with modification of at least one code-based
  object;
  transporting the refactoring object to a set of independent systems in the system landscape via inserting, at a root system, the refactoring object into a refactoring transport request and distributing the refactoring transport request to the set of independent systems, each independent system coupled to a communications network and the set of independent systems comprise a test system and a production system;
  requesting, from a user, an indication of approval associated with the refactoring object;
  receiving, from the user, the indication of approval;
  after receiving said indication of approval, arranging for modifications of code-based objects to be performed at each system of the set of independent systems in the system landscape;
  maintaining a refactoring registry associated with refactoring objects, the refactoring registry comprising a refactoring object identifier, a system associated with the refactoring object identifier and a status, wherein the status includes current state of the refactoring as being pending, in process, complete or occurrence of an error; and
  receiving an indication from each independent system at the refactoring registry, the indication confirming whether the refactoring has been executed successfully.

19. The method of claim 18, further comprising:
  receiving, from the user, at least one indication of non-approval associated with the refactoring object; and
  after receiving the indication of non-approval, arranging for at least one modification of a code-based object to not be performed.

20. The method of claim 1, further comprising: checking for completeness of the modifications by querying a where-used list at the refactoring registry to determine that all objects have been successfully adjusted and their respective transport requests have been released.

* * * * *